United States Patent
Piccand et al.

(10) Patent No.: US 10,282,484 B2
(45) Date of Patent: May 7, 2019

(54) SYSTEMS AND METHODS FOR ONTOLOGICAL SEARCHING IN AN IOT ENVIRONMENT

(71) Applicant: Verisign, Inc., Reston, VA (US)

(72) Inventors: Regis Piccand, Bulle (CH); Asbjorn Mikkelsen, Chenens (CH); Andrew Fregly, Reston, VA (US); Asif Akhtar, Villars sur Glane (CH)

(73) Assignee: VERISIGN, INC., Reston, VA (US)

( * ) Notice: Subject to any disclaimer, the term of this patent is extended or adjusted under 35 U.S.C. 154(b) by 915 days.

(21) Appl. No.: 14/595,104

(22) Filed: Jan. 12, 2015

(65) Prior Publication Data

US 2016/0203234 A1    Jul. 14, 2016

(51) Int. Cl.
| | | |
|---|---|---|
| *G06F 17/30* | (2006.01) | |
| *H04L 29/12* | (2006.01) | |
| *G06F 17/27* | (2006.01) | |
| *H04W 4/70* | (2018.01) | |
| *H04W 84/18* | (2009.01) | |

(52) U.S. Cl.
CPC ...... *G06F 17/30917* (2013.01); *G06F 17/277* (2013.01); *G06F 17/30312* (2013.01); *G06F 17/30525* (2013.01); *G06F 17/30589* (2013.01); *G06F 17/30734* (2013.01); *G06F 17/30958* (2013.01); *H04L 61/1511* (2013.01); *H04L 61/3025* (2013.01); *H04W 4/70* (2018.02); *H04L 61/305* (2013.01); *H04W 84/18* (2013.01)

(58) Field of Classification Search
CPC ......... G06F 17/30958; G06F 17/30867; G06F 17/30961; G06F 17/30097
USPC ......................................................... 707/798
See application file for complete search history.

(56) References Cited

U.S. PATENT DOCUMENTS

| | | | |
|---|---|---|---|
| 2010/0070517 A1 | 3/2010 | Ghosh et al. | |
| 2012/0303746 A1* | 11/2012 | Yu | H04L 67/12 709/217 |
| 2014/0108943 A1* | 4/2014 | Lee | G06F 3/04817 715/738 |
| 2014/0244768 A1* | 8/2014 | Shuman | H04L 51/32 709/206 |
| 2015/0019714 A1* | 1/2015 | Shaashua | H04L 67/24 709/224 |
| 2016/0028780 A1* | 1/2016 | Verzano | H04W 4/70 709/204 |

OTHER PUBLICATIONS

Extended European Search Report Application No. 16150942.7, dated Jun. 1, 2016, 9 pages.

(Continued)

*Primary Examiner* — Michael Pham
(74) *Attorney, Agent, or Firm* — Artegis Law Group, LLP

(57) ABSTRACT

Provided a method for creating a searchable registry based on a ontology for IoT devices and associated data feeds. The method can include registering a IoT device and its associated data feed in a record with a searchable registry; creating relationships between IoT devices and associated data feeds; associating the records with one or more ontology terms of a hierarchical ontology describing a characteristic of the IoT device, the associated data, the relationships or all of them; and providing a response to a request of an IoT device based on the mapping.

18 Claims, 7 Drawing Sheets

(56) References Cited

OTHER PUBLICATIONS

"FI-WARE Internet of Things (IoT) Services Enablement", FIWARE Forge Wiki, Mar. 27, 2014 (Mar. 27, 2014), pp. 1-22, XP055273998, Retrieved from the Internet: URL:http://forge.fiware.org/plugins/mediawiki/wiki/fiware/index.php?title=FI-WARE Internet_of_Things_%28IoT%29_Services_Enablement&oTdid=49495 [retrieved on May 20, 2016] p. 9-p. 11; p. 14-p. 16.

* cited by examiner

SYSTEMS AND METHODS FOR ONTOLOGICAL SEARCHING IN AN IOT ENVIRONMENT

BACKGROUND

The use of the Internet for purposes that extend beyond the current model of Web browsers interacting with Websites is growing rapidly. In particular, many devices are now being exposed on the Internet so as to enable interactions with those devices from devices and applications that are also connected to the Internet. As a result of this increasing usage of the Internet for interaction with connected devices, this commonly called the Internet of Things (IOT), there is a growing demand for technology that enables these interactions to be performed securely in a way that protects the privacy of the data being exchanged in the interactions. The Internet has related to it standards, such as Domain Naming System (DNS) related standards, that can be leveraged in a number of ways to support data communications, device discovery and privacy protection. The invention described here-in discloses novel means by which interactions between entities on the Internet can be enabled and other services provided that enable IOT capabilities, many of these incorporating new uses of DNS related standards.

SUMMARY

In some aspects, a method for creating a searchable registry based on a ontology for IoT devices and associated data feeds is disclosed. The method can comprise registering a IoT device and its associated data feed in a record with a searchable registry; creating relationships between IoT devices and associated data feeds; associating the records with one or more ontology terms of a hierarchical ontology describing a characteristic of the IoT device, the associated data, the relationships or all of them; and providing a response to a request of an IoT device based on the mapping.

The method can further comprise creating a graph database for the hierarchical ontology comprising a root node representing a general aspect of the ontology and a plurality of child nodes representing more specific types of the general aspect of the ontology and mapping the record to the graph database.

The method can further comprise obtaining a search request from a requestor for an IoT device or associated data feed; parsing the search request to identify the IoT device or data feed being requested; traversing the graph database to locate a node associated with the IoT device or data feed being requested; and providing a result to the requestor, including relationships established between IoT devices and their associated data feeds.

The method can further comprise adding a new ontology to the ontology, wherein the new ontology modifies at least one characteristic of the ontology.

The method can further comprise determining that the IoT device or data feed being requested is not located in the graph database; and returning a more generic answer to the search request.

A method of routing messages between internet of things ("IoT") devices using ontologies, is disclosed. The method can comprise obtaining a message from a first IoT device intended using a publish/subscribe messaging protocol; obtaining message routing criteria relative to ontology-based criteria; determining that information related to the message is defined by an ontology; determining routing for the message based on the correspondence of message data to the ontology and routing criteria associated with the ontology; and providing the message to a second IoT device based on the determined routing.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Aspects of the present disclosure are related to an Internet of Things (IOT) service. According to aspects, the IOT service includes a bundle of services that allow IOT devices to be registered, authenticated, and securely communicate with consumers and users. The IOT service utilizes DNS processes and services to register and authenticate the IOT devices.

Figure 1:
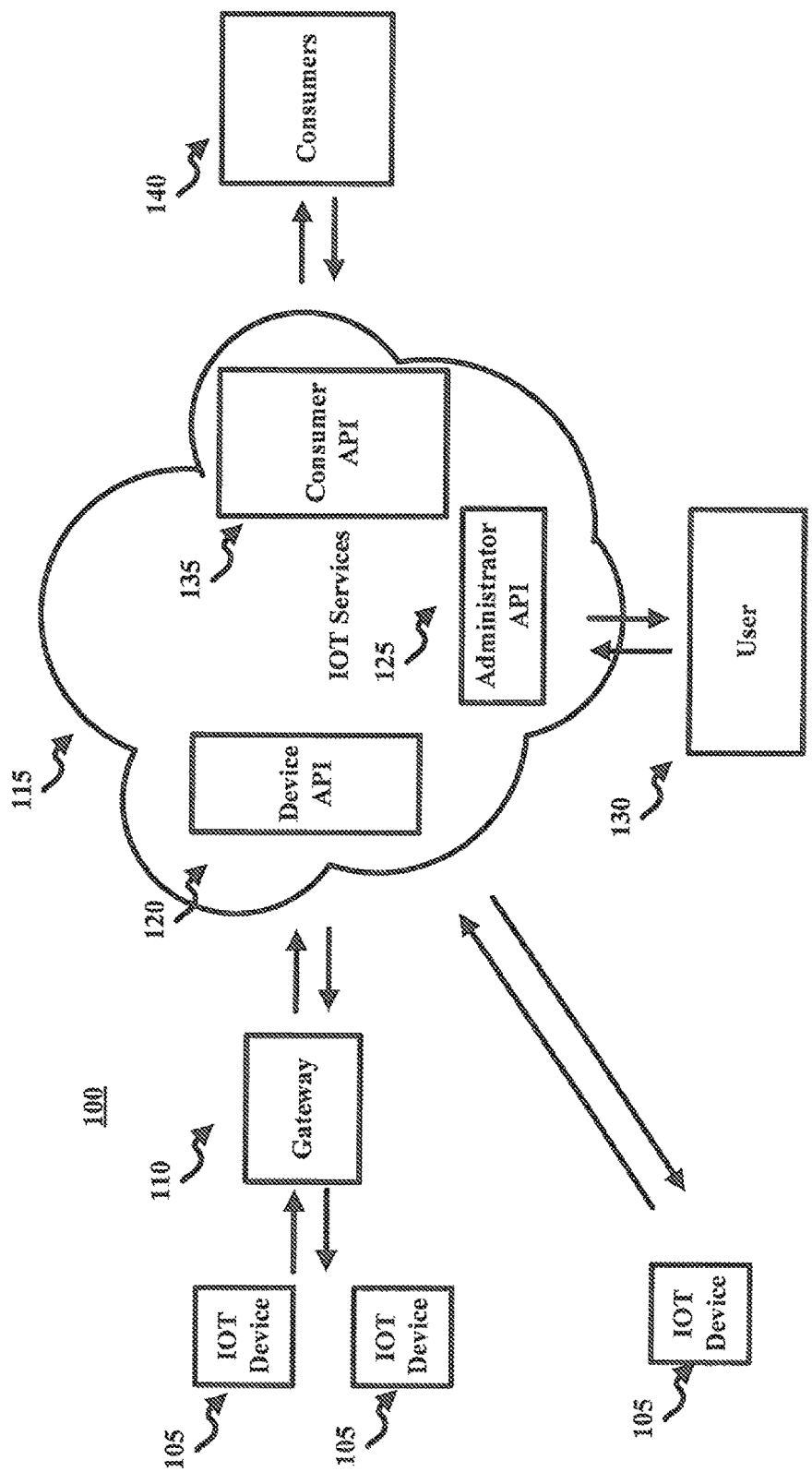
FIG. 1 illustrates an IOT environment including an IOT service, according to various aspects of the present disclosure.

FIG. 1 illustrates an IOT environment 100 including an IOT service 115, according to various aspects of the present disclosure. While FIG. 1 illustrates various components contained in the IOT environment 100, FIG. 1 illustrates one example of an IOT environment and additional components can be added and existing components can be removed.

As illustrated, the IOT environment 100 can include a number of IOT devices 105. The IOT devices 105 can be any type of electronic device that is capable of communicating with other electronic devices. For example, the IOT devices 105 can include a wide variety of devices such as conventional computing device, smart phones, appliances (e.g. washer/dryers that utilize network communications, smart thermostat systems, etc.), sensors (e.g. remote monitoring heart monitoring implants, biochip transponders, automobiles sensors, etc.), and the like.

In aspects, the IOT devices 105 can include the necessary hardware and software to directly communicate with an IOT service 115. In this example, the IOT devices can include the necessary hardware and software to communicate with the IOT service 115 using various protocols supported by the IOT service such as publish-subscribe messaging protocols, i.e., Message Queue Telemetry Transport ("MQTT"), and Domain Name System ("DNS") processes and services. Likewise, the IOT devices can be connected to an intermediary, such as a gateway 110. In this example, the gateway 110 can include the necessary hardware and software to communicate with the IOT devices 105 and the necessary hardware and software to communicate with the IOT service utilizing various protocols supported by the IOT service such as MQTT and DNS processes and services.

The Domain Name System ("DNS") is the part of the Internet infrastructure that translates human-readable domain names into the Internet Protocol ("IP") numbers needed to establish TCP/IP communication over the Internet. DNS allows users to refer to web sites, and other resources, using easier to remember domain names, such as "www.example.com", rather than the numeric IP addresses associated with a website, e.g., 192.0.2.78, and assigned to computers on the Internet. Each domain name can be made up of a series of character strings (e.g., labels) separated by dots. The order of the labels represents a relationship between domain names within the DNS hierarchy. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "www.example.com". Domains can nest within the hierarchy for many levels. For example, each second-level domain can include a number of third-level domains located immediately to the left of the second-level domain, e.g. the "www" level in www.example.com. The labels in a domain name include one or more characters, each of which may either be an ASCII character or a language-specific character (e.g., Arabic, Chinese, Hindi, and Latin letters with diacritics (e.g., é)). Domain names represented, in whole or in part, by language-specific characters are called Internationalized Domain Names (IDNs). While not yet available, potential IDN versions of well-known TLDs, such as ".com," ".net," and ".org." could also be created.

The responsibility for operating each TLD, including maintaining a registry of the second-level domains within the TLD, is delegated using a hierarchy of DNS services with different entities acting as the "registry" or "authoritative" registry for a portion of the hierarchy to a particular organization, known as a domain name registry ("registry"). The registry is primarily responsible for answering queries for IP addresses associated with domains ("resolving"), typically through DNS servers that maintain such information in large databases, and for operating its top-level domain.

For most TLDs, in order for end-users to obtain a domain name, that domain name has to be registered with a registry through a domain name registrar, an entity authorized to register Internet domain names on behalf of end-users. Alternatively, an end-user can register a domain name indirectly through one or more layers of resellers. A registry may receive registrations from hundreds of registrars.

The DNS distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism generally helps avoid the need for a single central registry to be continually consulted and updated. The DNS resolution process allows for users to be directed to a desired domain by a lookup process whereby the user enters the desired domain, and the DNS returns appropriate IP numbers. During the DNS resolution process, a request for a given domain name is routed from a resolver (e.g., a stub resolver) to an appropriate server (e.g., a recursive resolver) to retrieve the IP address. To improve efficiency, reduce DNS traffic across the Internet, and increase performance in end-user applications, the DNS supports DNS cache servers that store DNS query results for a period of time determined by the time-to-live (TTL) of the domain name record in question. Typically, such caching DNS servers, also called DNS caches, also implement the recursive algorithm necessary to resolve a given name starting with the DNS root through to the authoritative name servers of the queried domain. Internet service providers (ISPs) typically provide recursive and caching DNS servers for their customers. In addition, home networking routers may implement DNS caches and proxies to improve efficiency in the local network.

According to aspects of the present disclosure, the IOT service 115 can assign a domain name to each of the IOT devices 105. The domain name can then be associated with the IP address of the IOT device 105. Domain names, i.e., qnames, can also be assigned by an entity owner of the IoT device 105. For those IOT devices 105 with IP address, the IOT devices can communicate with the IOT service 115 to register and obtain a domain name. Other IOT devices 105, which do not have the ability to communicate directly with the IOT service 115, the gateway 110 can serve as an intermediary and can communicate with the IOT service 115 to obtain a domain name or the gateway 110 and/or the IOT devices 105.

To facilitate the registration of IOT devices, an IOT service can provide an application programming interface (API) that performs DNS registration of IOT devices on behalf of devices and gateways. The IOT service 115 can provide a domain name that uniquely identifies the devices as IOT devices and also shows the relationship of the devices. For example, the IOT service 115 can establish a domain for IOT devices such as ".iotservice.com." As the devices are registered with the IOT service 115, the IOT service assigns the domain name and creates the DNS records for the IOT devices. For example, if the IOT devices 105 are owned by "Company A," the IOT service can create a domain "companyA.iotservice.com." The IOT service 115 can assign a unique domain name to each of the IOT devices, for example, "itodevice1.companyA.iotservice.com." The domain and the domain names for each of the IOT devices that allows consumers 140 to locate and communicate with the IOT devices 105.

The IOT service 115 can also include an API 125 to allow a user 130 to communicate with the IOT service 115. The user 130 can communicate with the IOT service to establish the services of the IOT service 115, register devices 105, and the like. The IOT service 115 can also include an API 135 to allow the consumers 140 to locate to locate and communicate with the IOT devices 105. In some aspects, one or more services provided by the IOT service 115 can reside in the cloud.

Figure 2:
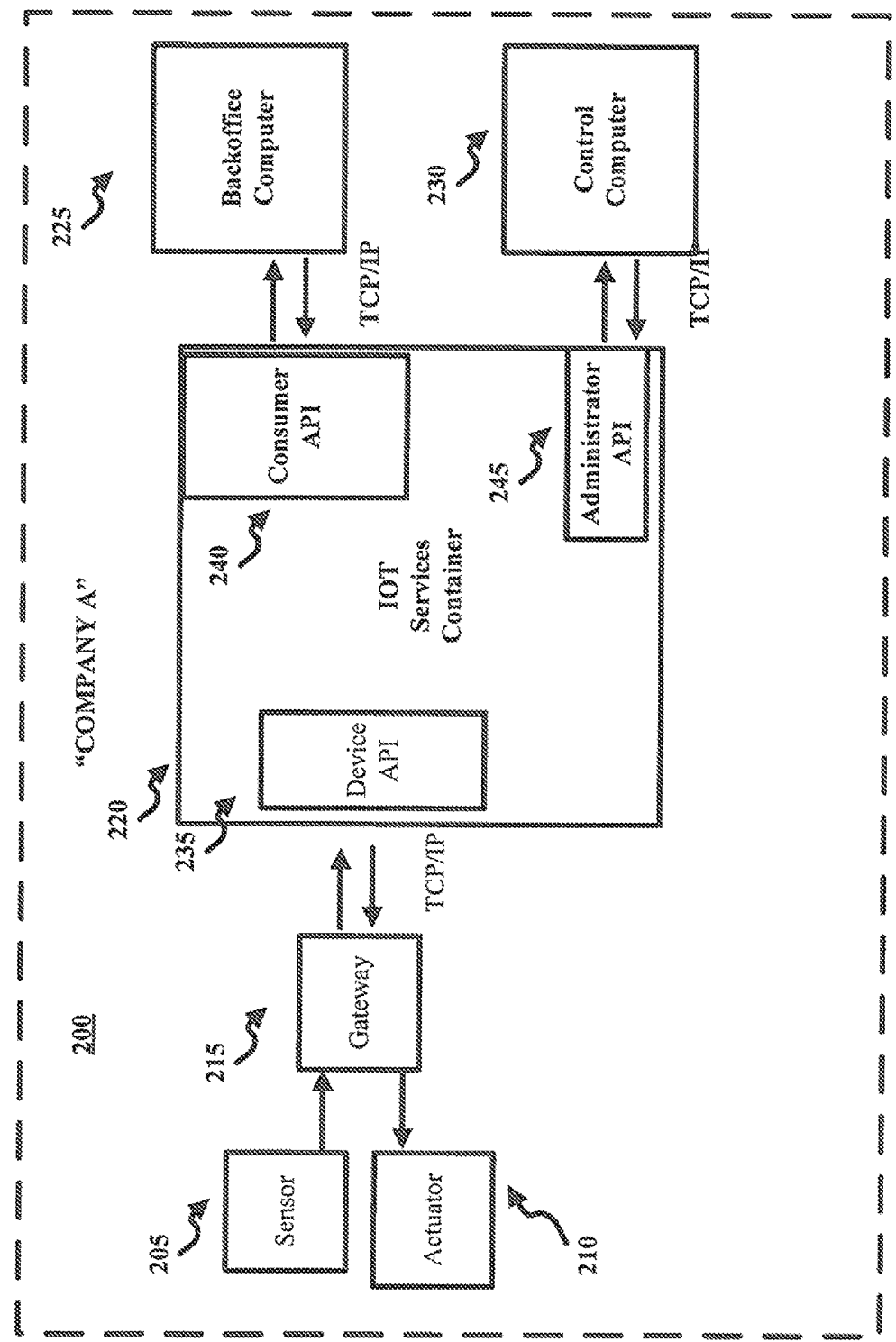
FIG. 2 shows an example internal organization environment (denoted by "Company A") having one or more IoT devices that can utilize an IOT service, according to various implementations.

FIG. 2 shows an example internal organization environment 200 (denoted by "Company A") having one or more IoT devices that can utilize an IOT service, according to various implementations. As illustrated in FIG. 2, the internal organization environment can include a first IoT device, shown as sensor 205, and a second IoT device, shown as actuator 210, which are in communication with a gateway device 215. The IoT devices can be utilized by Company A in daily operations. For example, the sensor 205 can monitor the temperature of a piece of manufacturing equipment and the actuator 210 can be a component of the manufacturing equipment, e.g. cooling fan. Company A can desire to monitor and utilize the IoT devices using a IoT service.

In this example, the IoT service can be implemented as an IoT services container. An IoT services container provides one or more services to an IoT device via one or more APIs. The one or more services can include, but are not limited to, an administrative service, a datameeter service, a crawler service, a messaging service, a DNS service. The IoT services container 220 is arranged between the gateway device 215 and a back office computer 225 and a control computer 230. In some example, the IoT services container can be included in the gateway device 215. The IoT services container can be hosted by Company A or can be hosted by a separate entity or organization.

In this example, the sensor 205, such as a temperature sensor, can detect the temperature of a particular area of Company A and send temperature readings, either continuously or periodically, to the to the gateway device 215 through a data feed. The gateway device 215 can communicate with the IoT services container 220, through a device API 235 over a communications protocol, i.e., TCP/IP, to provide the data feed to subscribers/consumers thereof. The back office computer 225, through a consume API 240 of the IoT services container 220 over a communications protocol, i.e., TCP/IP, may be operable to perform various functions, including, but are not limited, administrative, record keeping, etc. The control computer 230, through an administrator API 245 of the Iot services container 220 over a communication protocol, i.e., TCP/IP, may be operable to monitor the temperature from the sensor 205 and determine that a particular action is warranted based its readings. In this example, if the control computer 230 determines that the temperature monitored by the sensor 205 is too high, the control computer 230 can send a signal through the IoT services container 220 to the actuator 210 to lower the temperature by turning on a fan for a given time period.

According to aspects of the present disclosure, the IOT service 115 can utilize DNS process and services, such as DNS-based Authentication of Named Entities (DANE) and DNSSEC to register and authenticate IOT devices, this enabling authentication of data received from IOT devices and also supporting encryption of data sent by IOT devices. DANE provides a mechanism for associating the public key or a certificate containing a public key with an IOT device that can be identified by means of a unique domain name associated with a device. This association of a device with its public key or certificate containing a public key is stored in DNS registry records, either TLSA or SMIMEA, that are identified by the unique domain name associated with a device DANE can be used for authentication and privacy for entities registered into the DNS as described above, i.e., IoT devices, containers, and applications. DANE provides a standards-based mechanism for storing and retrieving the public keys used in authentication and encryption mechanisms. Every entity has a private/public key pair. The private key used by the entity for signing and encrypting data, and the public key used by entities wishing to verify the authenticity of signed data received from a entity and/or to decrypt encrypted data received from an entity. The public key for registered entities is available from DNS by querying the DNS for the DANE defined record corresponding to the entity. The record to be retrieved is identified in the query using a derivation of the domain name (Qname) as the search value. A retrieved record containing the public key for an entity is the one created by the IOT registration process. These records will be of a type defined by the DANE protocol, either TLSA or SMIMEA.

The integrity of the authentication and encryption processes described here-in relies on trusting that only the entity to which a private key applies will use that private key to sign messages or for encrypting communications (messages) generated by the entity. Entities are expected to keep the private key in secure storage that only the entity has access too. An entity can use the private and public keys as part of participating in a communication using a secure transport, TLS/DTLS. This present disclosure also applies to messages originated from an entity and which have been signed by the entity as a means of assuring the authenticity of such messages. Additionally, a device could encrypt messages using the private key of the device so as to protect the privacy of the data contained in the messages. Additionally, a device (A) could encrypt messages using the public key of another device (B) so as to protect the privacy of the data contained in the messages. Since only device B has the private key, only device B is able to decrypt the message.

Entities communicate with each other via IOT message services. One example of such a service is a publish/subscribe messaging infrastructure on which a feed-based messaging protocol is based. In this example, an entity can publish messages to a specific feed based on a feed identifier (feed ID) that is unique within the messaging service. Entities subscribed to a feed identified by that feed identifier will receive messages published to the feed. The message data published to feeds can be described with a shared ontology that standardizes the terms used for the data elements contained in messages, i.e., temperature, speed, etc. Message flows are typically one-way. Two-way messaging uses two one-way flows i.e. for two entities to communicate, each would subscribe to a feed to which the other publishes messages. Entities can be broadly characterized as IoT devices, applications, services, and containers (IoT service containers), and can be grouped into a variety of arrangements including, but not limited to the following: a device (such as a thermometer) that publishes data (such as temperature) to a feed, which then provides that data to an entity interested in using that data (a web app that displays current temperature); an entity (a light bulb) that can be controlled via messages it receives from a feed it subscribes to which a controlling entity (Web app) publishes control messages (toggle light bulb on and off).

In the IoT environment, in order for IoT devices to communicate, the IoT device initiating the interaction must know the other IoT device's address (unicast). Given the potential number of addressable IoT devices (tens of billions) and their heterogeneous nature (ranging from simple temperature sensors to highly specialized medical devices), it would be beneficial to have a dedicated search engine that is capable of finding IoT devices based on specific criteria. Thus, IoT devices can be found, interconnected with each other, and able to communicate with each other. Those specific search criteria can apply to the IoT device's description as well as the description of the data feeds it provides. Traditionally, search engines have followed a "full-text search" approach—they scan the searchable content and index the words so that those link back to the original content. This approach is known to yield ambiguous results, as the indexed words do not carry any semantic or contextual notion. Accordingly, aspects of the present disclosure leverages ontologies to provide a semantic-enabled search capability for IoT devices and data feeds stored as one or more records in a searchable registry.

After registering a IoT device and its feed(s), the records can be associated with an ontological term describing them as a whole, and/or with a set of semantic terms that refer to some of their particular elements/properties. Ontologies can be organized hierarchically, from most abstract to most specific. IoT device and feed records can link to any specific level of ontologies. The more abstract the relational level, the less specific the search results.

By using ontologies, and linking explicitly the records being indexed to terms described in those ontologies, the search mechanism may apply the search criteria to the ontologies themselves, and return the actual records related to those ontological terms. This allows for contextual search, restricted to specific ontologies only. The search results are therefore non-ambiguous. The search mechanism may also leverage on the ontology structure, to yield results that are related to a higher, most abstract term or lower, more specific term.

As an example, consider the following "thing" ontology structure. Car ontology (extends Thing). Ford ontology (extends Car). Mustang ontology (extends Ford). Assume a Ford Mustang 1964 is registered, and linked to the Mustang ontology. A search for the term "vehicle" in the context of the Car ontology could return any registered car, including the Ford Mustang 1964 record (more specific). Assume there is no Ford Mustang registered. A search in the context of the Mustang ontology should yield no results. However, the search engine may then search one level higher (more abstract) and return other Ford vehicles.

The ontology-based search methodology works by indexing ontologies and associating each IoT device and feed description with a set of corresponding ontological terms. The search algorithm will look up the indexed ontological terms and return the list of IoT devices and feeds linked to those terms matching the search criteria, either exactly or by the way of the ontology structure. By not only searching a corpus of indexed data, but also a corpus of indexed ontologies, the search algorithm and the corresponding results will tend to be less ambiguous and will yield better results. The systems will provide the users with the ability to register ontologies, which will then be indexed and added to the searchable data.

When registering an IoT device and its feeds, those records can be associated with existing devices and feeds, thus creating relationships among those records. Those relationships can be tagged using semantic terms from existing or newly uploaded ontologies. When search results are displayed, those relationships are visible, so that the user can see how a device or feed relates to other devices or feeds. The user may also choose to navigate the search results by following those relationships. The search algorithm may also leverage on those semantic relationships and allow users to search for devices and feeds based on the properties of their relationships.

An ontology-based routing mechanism for a messaging infrastructure is disclosed. The mechanism applies ontologies as a means of determining message routing within a messaging system. The ontology driven routing mechanism provides the following capabilities: 1. one or more ontologies may be associated with the routing mechanism; 2. data associated with a message is mapped onto an ontology by the routing mechanism; 3. data that is associated with a message may be any combination of the following, but is not limited to: data extracted from the message, data extracted from any "wrapper" enclosing the message, data derived relative to the message such as time of receipt, data rates; 4. routing criteria are provided to the routing mechanism for it to use in determining how to route a message; 5. routing criteria define selection criteria for data associated with a message; 6. routing criteria provide for destination selection based on logic applied to data associated with a message; 7. the categorization of data associated with a message is based on the association of data associated with a message to ontology elements; 8. selection criteria creation and execution is subject to capabilities that are applicable based on the ontological categorization of data elements.

Ontology-based routing for messaging infrastructure can be instantiated by: 1. having an ontology driven routing mechanism "subscribe" to messages that are being transmitted through a messaging system; 2. the ontology driven routing mechanism receives messages that it has subscribed to and performs routing determination as described above; 3. the ontology driven routing mechanism submits messages into the messaging system addressed such that they are routed to the appropriate destinations based on the routing determination(s) as described in step 2; 4. the message system that the ontology driven routing mechanism routes message through need not be the messaging system from which it receives subscribed-to messages; 5. the ontology driven routing mechanism may route messages via mechanisms other than messaging systems, such as storing a message in a database and associating with the message the routing that was determined for it; 6. the ontology driven routing mechanism may be intrinsic to the messaging system, in which case setting up ontology-based routing is intrinsic to the configuration of the messaging system.

The ontology-based routing can also include an ontology plug-in architecture that allows for a community of ontology creators to create domain-specific ontologies. As users add more devices/feeds into the registry, there may be a need to add new ontologies or extend existing ones so that the specifics of the devices and feeds can be mapped to ontologies accordingly. A particular ontology can be selected and used that can be attached to one or more existing ontologies. A messaging system can then provide for generalized feeds that support a variety of message types.

For example, consider a semantic search engine leveraging on ontologies to yield non-ambiguous results. When a user registers a new IoT device/feed, the user can associate those records with terms described in known ontologies. Those ontologies specify a structure and vocabulary for a domain-specific context at a certain level of abstraction. The user may however want to associate the registered IoT device and feeds with semantic terms of a more specific nature. In this example, assume the user registers his Kenwood XYZ smart fridge. The system may already provide a Fridge Ontology that specifies a structure and vocabulary specifically for fridges, in general. The user could associate his smart fridge with the terms described in that ontology. However, he would not be able to associate terms that are strictly specific to his Kenwood XYZ fridge, as they are not part of the Fridge Ontology. As a result, users can extend ontologies already in the system with their own. Those will be added to a searchable ontology repository, so that a user searching for IoT devices/feeds can leverage on those new ontologies and yield appropriate results. The ontology repository can be browsed/searched to allow users to see what already exists and determine whether there is a need for adding new ontologies.

In some instances, it would be helpful to transform an OWL (web ontology language) ontology to JavaScript Object Notation for Linked Data (JSON-LD). OWL is a language for authoring ontologies or knowledge bases. JSON is a lightweight, text-based data interchange format whereas JSON-LD is a method of transporting linked data using JSON. A method is disclosed that converts a defined OWL ontology into a JSON-LD context that enables a client to send data very similar to standard JSON and which standard JSON parsers should be able to successfully parse.

A current problem with JSON-LD documents is that the extra linked data elements (e.g., "@id," '@type," and "@context") does not look familiar to someone that is only used to standard JSON documents. There are also standard JSON parsers that do not handle the "@"-elements correctly. The approach creates a JSON-LD external context in a particular way that makes the corresponding JSON document look just like the standard JSON which should both look more familiar to the JSON community and which also should be able to be parsed and created by the existing JSON tools.

A standard JSON-LD document could look like the following for an entity create:

```
(
        "@context': {
    "dm": http://www.datameeter.com/ontologies/DM#"
    ),
    "@type": dm:Entity",
    "dm: name": "M4-Z1 Sensor",
    "dm: description": "M4 Sensor measuring Segments Z1-Z8 on
the M4 highway",
    "dm: hasCategory": (
    "@id": http://www.datameeter.com/ontologies/DM#vehicles,
        "@type": "@id"
    ),
    "dm: hasAttribute": [
    [
    "key": "sensorSnowType1",
    "value": "sensorDescription1",
    "@type": "dm: Attribute"
    },
    (
    "key": "sensorHumidityType2"
    "value": "sensorDescription2",
    )
    ]
    }
```

Both the name spaces (e.g., "dm:") and the "@" elements could look unfamiliar to someone not used to the linked data notations. The idea is that the end user instead would just send the below:

```
{
    "@context": http://www.datameter.com/contexts/entity.jsonId,
        "name": "M4-Z1 Sensor",
        "description": "M4 Sensor measuring Segments Z1-Z8 on the
M4 highway",
        "hasCategory": (
            "type": "vehicles"
    ),
```

-continued

```
    "hasAttribute": [
    (
    "key": "sensorSnowType1",
    "value": "sensorDescription1"
    ),
    (
    "key": "sensorHumidityType2",
    "value": "sensorDescription2"
    )
    ]
    ).
```

This looks exactly like standard JSON except the "@context" element which can be sent either as displayed above or as an HTTP header element. The external context does the conversion between the JSON provided elements and the actual JSON-LD elements. For example, the below external context (referenced above as entity .jsonid):

```
(
    (
    "@context": (
    "type": "@type",
    "Entity": http://www.datameeter.com/ontologies/DM#Entity,
    "Agent": http://www.datameeter.com/ontologies/DM#Agent,
    "Account": http://www.datameeter.com/ontologies/DM#Account,
    "Feed": http://www.datameeter.com/ontologies/DM#Feed,
    "name": http://schema.org/name,
    "description": http://schema.org/description,
    "key": http://www.datameeter.com/ontologies/DM#key,
    "value": http://www.datameeter.com/ontologies/DM#value,
    "uuid": http://www.datameeter.com/ontologies/DM#uuid,
    "Category": http://www.datameeter.com/ontologies/DM#Category,
    "Buildings": (
        "@id": http://www.datameeter.com/ontologies/DM#Buildings,
        "@type": "Category"
    ),
    "commercialinstitutional": (
        "@id": http://www.datameeter.com/ontologies/DM#
commercialinstitutional,
        "@type": "Buildings"
    ),
    "industrial": (
    "@id": http://www.datameeter.com/ontologies/DM#industrial,
    "@type": "Buildings"
    ),
    [Removed other Category elements for readability]
    "hasCategory": (
        "@id": http://www.datameeter.com/ontologies/
DM#hasCategory,
        "@type": "Category"
    ),
    "Attribute": (
        "@id": http://www.datameeter.com/ontologies/DM#Attribute,
        "key": "key"
        "value": "value",
        "uuid": "uuid"
    ),
    "hasAttribute": (
        "@id": http://www.datameeter.com/ontologies/
DM#hasAttribute,
        "@type": "Attribute"
        "@container": "@list"
    ),
    "hasEntityOwner": (
        "@id": http://www.datameeter.com/ontologies/
DM#hasEntityOwner,
        "@type": "Account"
    ),
    "entityCreatedBy": (
        "@id": http://www.datameeter.com/ontologies/
DM#entityCreatedBy,
        "@type": "Agent"
    ),
    "hasFeed": (
        "@id": http://www.datameeter.com/ontologies/DM#hasFeed,
```

```
        "@type": "Feed",
        "@container": "@list"
    )
  )
).
```

This JSON-LD external context file can be generated by a software tool. Based on a JSON configuration file, a specific external context(s) are generated based on the OWL ontology definition file(s). The tool has the ability to ignore and add defined terms specifically based on a configuration file and also has the ability to expand certain elements so it (as described in the example above) will recursively drill down and define all the category subordinate terms. The net result is a JSON-looking JSON-LD file that should be possible to generate and parse by standard JSON parsers without having any knowledge about JSON-LD.

The OWL ontology can be imported into a graph database. A graph database is a database that uses graph structures with nodes, edges, and properties to represent and store data. A software tool is disclosed that converts and imports an OWL ontology into graph databases nodes, edges and properties. This approach can allow semantic capabilities in a graph database by importing and using an ontology. In order to enable sematic search in IoT or ontology traversal, ontology elements are used to be present in a database, in this case a graph database.

For example, consider the following sub-set of classes from an example Vehicle ontology (in RDF/XML format):

```
Top level class:
<owl:Class rdf:about="http://www.verisign.com/vehicle#Vehicle"/>
Car, sub-class of Vehicle:
<owl:Class rdf:about="http://www.verisign.com/vehicle#Car">
    <rdfs:subClassOf rdf:resource="http://www.verisign.com/vehicle#Vehicle"/>
</owl:Class>
BMW, sub-class of Car:
<owl:Class rdf:about="http://www.verisign.com/vehicle#BMW">
    <rdfs:subClassOf rdf:resource="http://www.verisign.com/vehicle#Car"/>
</owl:Class>
BMW_6_Series, sub-class of BMW:
<owl:Class rdf:about="http://www.verisign.com/vehicle#BMW_6_Series">
    <rdfs:subClassOf rdf:resource="http://www.verisign.com/vehicle#BMW"/>
</owl:Class>
BMW_6_Series_Coupe, sub-class of BMW_6_Series:
<owl:Class rdf:about="http://www.verisign.com/vehicle#BMW_6_Series_Coupe">
    <rdfs:subClassOf rdf:resource="http://www.verisign.com/vehicle#BMW_6_Series"/>
</owl:Class>
BMW_6_Series_Coupe_650i, a named individual (member) of BMW_6_Series_Coupe:
<owl:NamedIndividual
rdf:about="http://www.verisign.com/vehicle#BMW_6_Series_Coupe_650i">
    <rdf:type rdf:resource="http://www.verisign.com/vehicle#BMW_6_Series_Coupe"/>
</owl:NamedIndividual>
```

Figure 3:
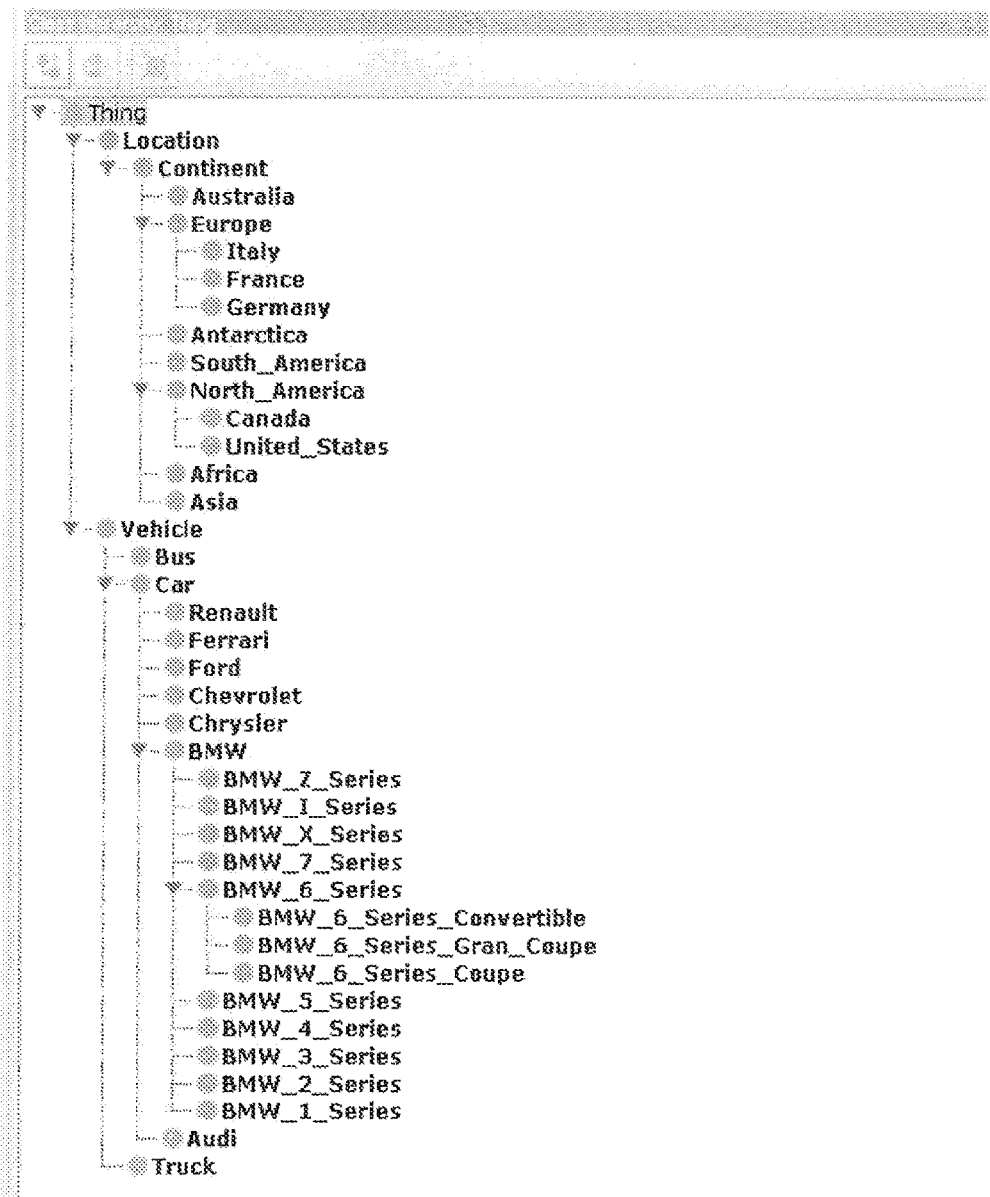
FIG. 3 shows an example class hierarchy as displayed in an open source ontology editor of a "thing" example ontology.
Figure 4:
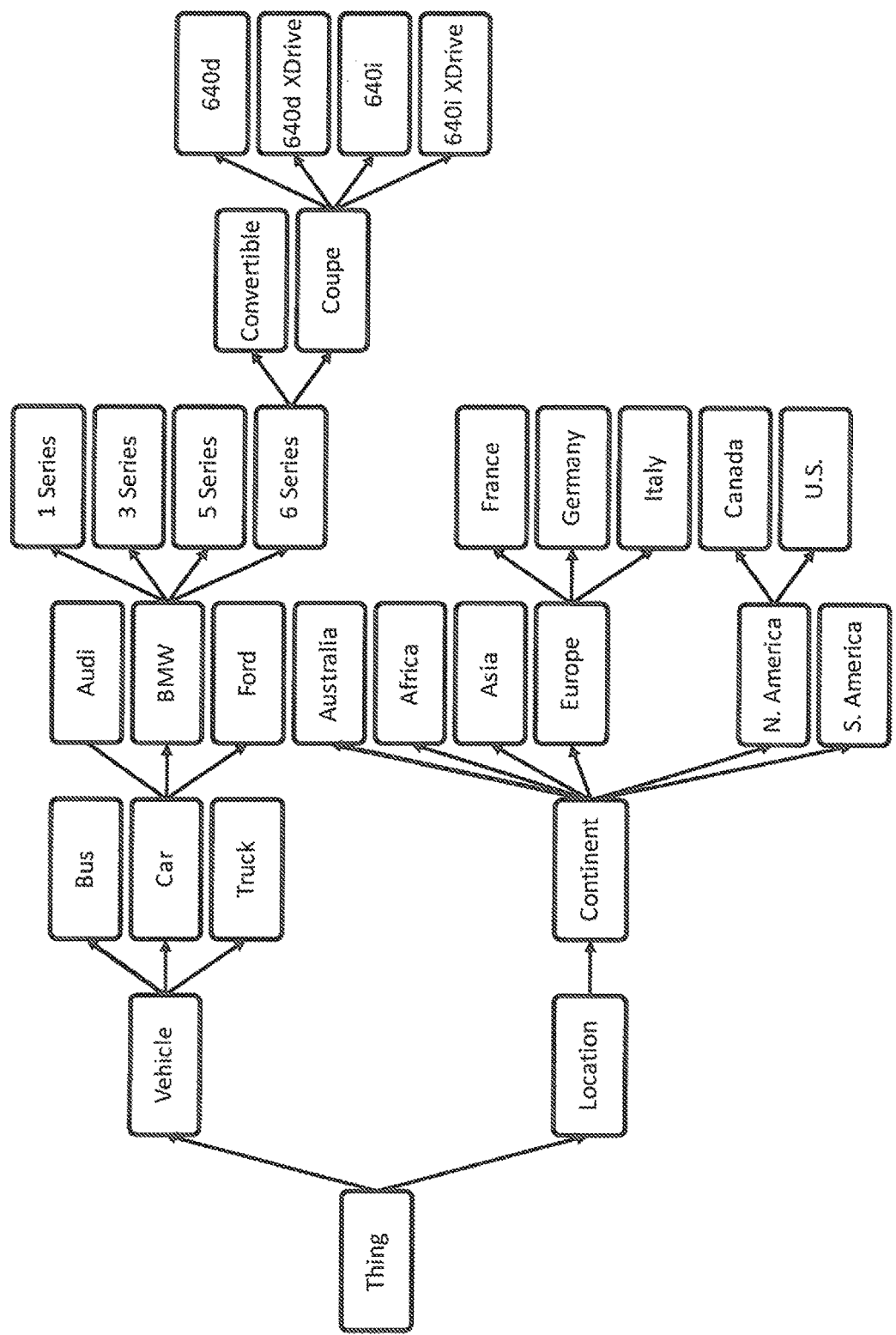
FIG. 4 shows an example graph database for the hierarchy shown in FIG. 3.

FIG. 3 shows an example class hierarchy as displayed in an open source ontology editor of a "thing" example ontology. The two main subclasses of "thing" are "location" and "vehicle" at are further sub-classed into counties for the "location" subclass and car model types for the "vehicle" subclass. FIG. 4 shows an example graph database for the hierarchy shown in FIG. 3. All "top-level" classes are then imported and represented in the graph database as nodes with an "isA" relationship to the root node. All sub-classes are imported and represented in the graph database as nodes with an "isA" relationship to their respective super-class. All named individuals are imported and represented in the graph database as nodes with an "isA" relationship to the parent class. All interrelationships are imported and represented in the graph database as edges connecting the start node and the end node. All relevant data property super-classes are imported and represented in the graph database as node properties in the respective node. After this process has been completed, the ontology can be traversed either programmatically or by using a graph database visualization tool.

Figure 5:
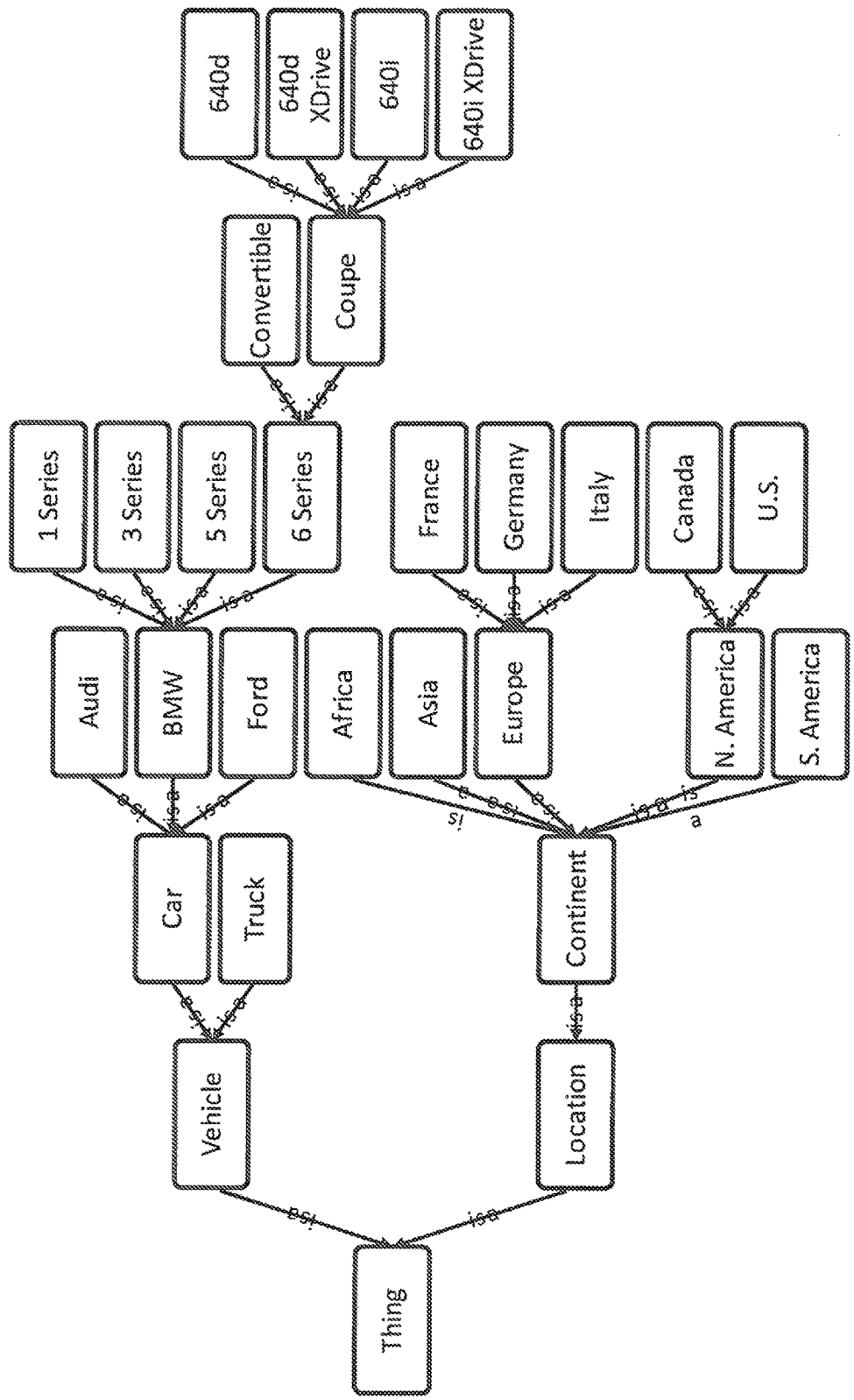
FIG. 5 shows an example graph database of FIG. 4 where all inserted nodes would be created with an "isA" edge to the class, and enumerated properties should create relationships to the respective ontology node.
Figure 6:
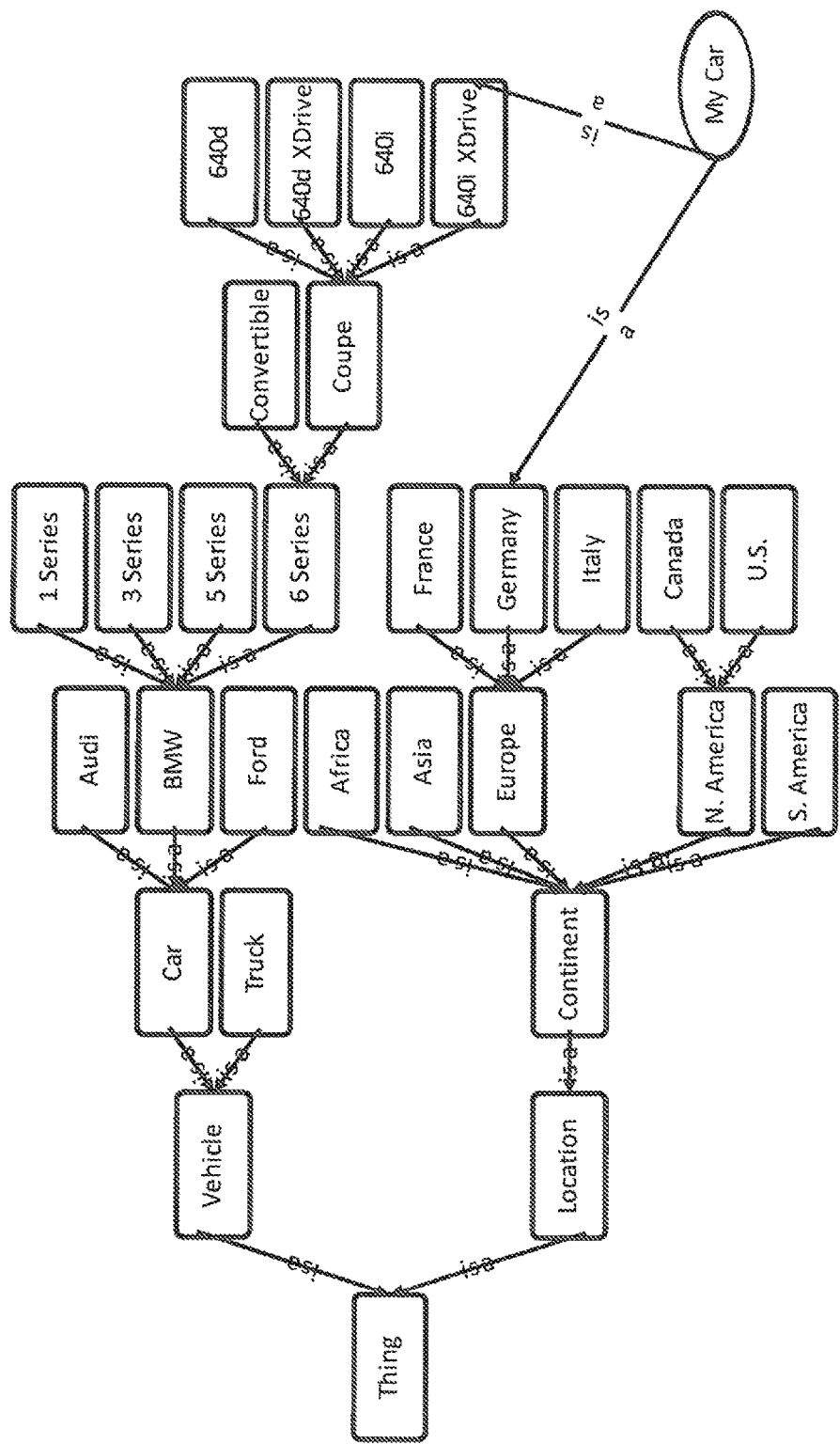
FIG. 6 shows an example of the graph database after one instance of a car (of type BMW 650i xDrive located in Germany.

When instance data is inserted in the graph database, all inserted nodes would be created with an "isA" edge to the class, and enumerated properties should create relationships to the respective ontology node, as shown in FIG. 5. FIG. 6 shows an example of the graph database after one instance of a car (of type BMW 650i xDrive located in Germany. In FIG. 6, the grey nodes represent the ones imported from the ontology and the yellow one is the instance data inserted afterwards. To find all cars currently located in Germany, the incoming relationships to the "Germany" node can be checked. To find all BMW 650i xDrive cars, the incoming relationships to that particular node can be checked. From a search or discovery perspective, one can browse from the "car" node to the "BMW" node to get a list of the specific cars of a particular type. As another example, if a node "feed" can be in the states "active," "inactive" or "pending" there will be three ontology nodes to represent them in the graph database as part of the import process. When a feed instance is later inserted with an "active" state, the new instance node should be created with a relationship to the already created ontology node representing the "active" state.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Figure 7:
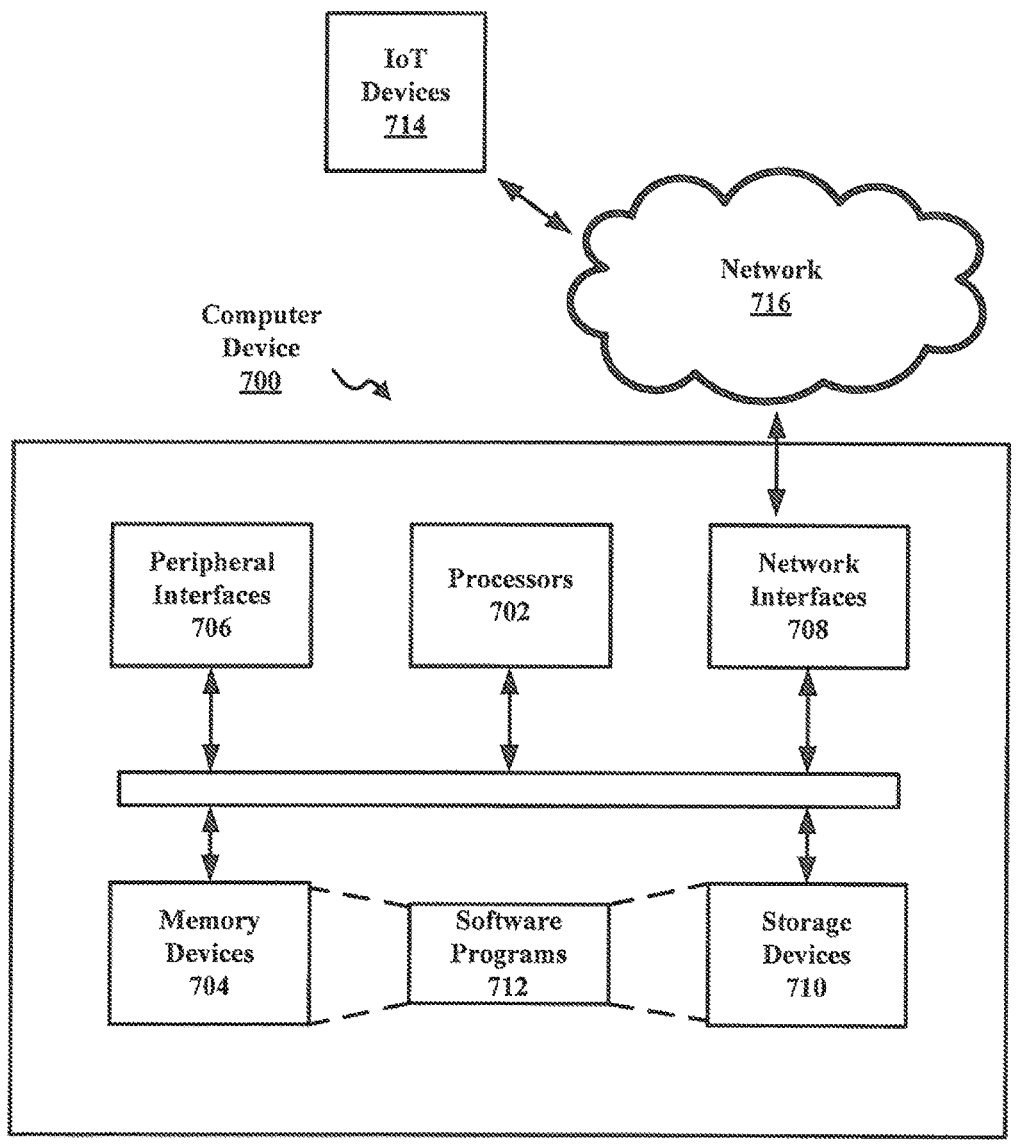
FIG. 7 illustrates an example of a hardware configuration for a computer device, according to various aspects of the present disclosure.

For example, FIG. 7 illustrates an example of a hardware configuration for a computer device 700, that can be used to perform one or more of the processes of the IoT service described above. While FIG. 7 illustrates various components contained in the computer device 700, FIG. 7 illustrates one example of a computer device and additional components can be added and existing components can be removed.

The computer device 700 can be any type of computer devices, such as desktops, laptops, servers, etc., or mobile devices, such as smart telephones, tablet computers, cellular telephones, personal digital assistants, etc. As illustrated in FIG. 7, the computer device 700 can include one or more processors 702 of varying core configurations and clock frequencies. The computer device 700 can also include one or more memory devices 704 that serve as a main memory during the operation of the computer device 700. For example, during operation, a copy of the software that supports the IoT service can be stored in the one or more memory devices 704. The computer device 700 can also include one or more peripheral interfaces 706, such as keyboards, mice, touchpads, computer screens, touchscreens, etc., for enabling human interaction with and manipulation of the computer device 700.

The computer device 700 can also include one or more network interfaces 708 for communicating via one or more networks, such as Ethernet adapters, wireless transceivers, or serial network components, for communicating over wired or wireless media using protocols. The computer device 700 can also include one or more storage device 710 of varying physical dimensions and storage capacities, such as flash drives, hard drives, random access memory, etc., for storing data, such as images, files, and program instructions for execution by the one or more processors 702.

Additionally, the computer device 700 can include one or more software programs 712 that enable the functionality of the IoT service described above. The one or more software programs 712 can include instructions that cause the one or more processors 702 to perform the processes described herein. Copies of the one or more software programs 712 can be stored in the one or more memory devices 704 and/or on in the one or more storage devices 710. Likewise, the data, for example, DNS records, utilized by one or more software programs 712 can be stored in the one or more memory devices 704 and/or on in the one or more storage devices 710.

In implementations, the computer device 700 can communicate with one or more IoT devices 714 via a network 716. The one or more IoT devices 714 can be any types of devices as described above. The network 716 can be any type of network, such as a local area network, a wide-area network, a virtual private network, the Internet, an intranet, an extranet, a public switched telephone network, an infrared network, a wireless network, and any combination thereof. The network 716 can support communications using any of a variety of commercially-available protocols, such as TCP/IP, UDP, OSI, FTP, UPnP, NFS, CIFS, AppleTalk, and the like. The network 716 can be, for example, a local area network, a wide-area network, a virtual private network, the Internet, an intranet, an extranet, a public switched telephone network, an infrared network, a wireless network, and any combination thereof.

The computer device 700 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 700 as described above need not be enclosed within a single enclosure or even located in close proximity to one another. Those skilled in the art will appreciate that the above-described componentry are examples only, as the computer device 700 can include any type of hardware componentry, including any necessary accompanying firmware or software, for performing the disclosed implementations. The computer device 700 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A method for creating a searchable registry for Internet of Things ("IoT") devices and associated data feeds, the method comprising:
    registering a first IoT device and a first data feed associated with the first IoT device in a first record with the searchable registry;
    creating a first set of relationships between the first record and existing records of other IoT devices and associated data feeds;
    associating the first record with one or more ontology terms of a hierarchical ontology describing at least one of the first IoT device, the first data feed, and the first set of relationships, wherein the hierarchical ontology is generated based on an imported ontology specified in web ontology language (OWL);
    applying search criteria of a request to the ontology terms of the hierarchical ontology; and
    providing a response to the request, the response including the first record having one or more associated ontology terms that match the search criteria.

2. The method of claim 1, further comprising:
    creating a graph database for the hierarchical ontology comprising a root node representing a general aspect of the hierarchical ontology and a plurality of child nodes representing more specific types of the general aspect of the hierarchical ontology; and
    mapping the first record to the graph database.

3. The method of claim 2, further comprising:
    obtaining a search request from a requestor;
    parsing the search request to identify a requested IoT device or requested data feed;
    traversing the graph database to locate a node associated with the requested IoT device or requested data feed; and
    providing a result to the requestor, including a second set of relationships established between the requested IoT device or requested data feed and other IoT devices and associated data feeds.

4. The method of claim 1, further comprising adding a new ontology to the hierarchical ontology, wherein the new ontology modifies at least one characteristic of the hierarchical ontology.

5. The method of claim 3, further comprising:
    obtaining another search request from the requestor for another requested IoT device or another requested data feed;
    determining that the another requested IoT device or the another requested data feed does not have an associated node located in the graph database; and
    returning a generic answer to the another search request.

6. A method of routing messages between internet of things ("IoT") devices, the method comprising:
    registering a second IoT device in a record with a searchable registry;
    associating the record with one or more ontology terms of a hierarchical ontology describing at least one characteristic of the second IoT device, wherein the hierarchical ontology is generated based on an imported ontology specified in web ontology language (OWL);
    obtaining a message from a first IoT device using a publish/subscribe messaging protocol;
    obtaining search criteria by mapping data associated with the message to one or more ontology terms of the hierarchical ontology;
    determining routing for the message by applying the search criteria to the ontology terms of the hierarchical ontology to search for a destination IoT device; and
    providing the message to the destination IoT device comprising the second IoT device based on the determined routing, wherein the record for the second IoT device includes one or more associated ontology terms that match the search criteria.

7. The method of claim 1, further comprising converting the imported ontology to a graph database comprising the hierarchical ontology, the graph database comprising a plurality of nodes, each node being associated with a particular IoT device.

8. The method of claim 1, further comprising converting the imported ontology to a JavaScript Object Notation for Linked Data (JSON-LD) file comprising the hierarchical ontology.

9. One or more non-transitory computer-readable media storing program instructions that, when executed by one or more processors, cause the one or more processors to create a searchable registry for Internet of Things ("IoT") devices and associated data feeds by performing the steps of:
registering a first IoT device and a first data feed associated with the first IoT device in a first record with the searchable registry;
creating a first set of relationships between the first record and existing records of other IoT devices and associated data feeds;
associating the first record with one or more ontology terms of a hierarchical ontology describing at least one of the first IoT device, the first data feed, and the first set of relationships, wherein the hierarchical ontology is generated based on an imported ontology specified in web ontology language (OWL);
applying search criteria of a request to the ontology terms of the hierarchical ontology; and
providing a response to the request, the response including the first record having one or more associated ontology terms that match the search criteria.

10. The one or more non-transitory computer-readable media of claim 9, further comprising:
creating a graph database for the hierarchical ontology comprising a root node representing a general aspect of the hierarchical ontology and a plurality of child nodes representing more specific types of the general aspect of the hierarchical ontology; and
mapping the first record to the graph database.

11. The one or more non-transitory computer-readable media of claim 10, further comprising:
obtaining a search request from a requestor;
parsing the search request to identify a requested IoT device or requested data feed;
traversing the graph database to locate a node associated with the requested IoT device or requested data feed; and
providing a result to the requestor, including a second set of relationships established between the requested IoT device or requested data feed and other IoT devices and associated data feeds.

12. The one or more non-transitory computer-readable media of claim 11, further comprising:
obtaining another search request from the requestor for another requested IoT device or another requested data feed;
determining that the another requested IoT device or the another requested data feed does not have an associated node located in the graph database; and
returning a generic answer to the another search request.

13. The one or more non-transitory computer-readable media of claim 9, further comprising adding a new ontology to the hierarchical ontology, wherein the new ontology modifies at least one characteristic of the hierarchical ontology.

14. A system for creating a searchable registry for Internet of Things ("IoT") devices and associated data feeds, the system comprising:
a memory that stores program instructions;
a processor that is coupled to the memory and, upon executing the program instructions, is configured to perform the steps of:
registering a first IoT device and a first data feed associated with the first IoT device in a first record with the searchable registry;
creating a first set of relationships between the first record and existing records of other IoT devices and associated data feeds;
associating the first record with one or more ontology terms of a hierarchical ontology describing at least one of the first IoT device, the first data feed, and the first set of relationships, wherein the hierarchical ontology is generated based on an imported ontology specified in web ontology language (OWL);
applying search criteria of a request to the ontology terms of the hierarchical ontology; and
providing a response to the request, the response including the first record having one or more associated ontology terms that match the search criteria.

15. The system of claim 14, wherein the processor is further configured to perform the steps of:
creating a graph database for the hierarchical ontology comprising a root node representing a general aspect of the hierarchical ontology and a plurality of child nodes representing more specific types of the general aspect of the hierarchical ontology; and
mapping the first record to the graph database.

16. The system of claim 15, wherein the processor is further configured to perform the steps of:
obtaining a search request from a requestor;
parsing the search request to identify a requested IoT device or requested data feed;
traversing the graph database to locate a node associated with the requested IoT device or requested data feed; and
providing a result to the requestor, including a second set of relationships established between the requested IoT device or requested data feed and other IoT devices and associated data feeds.

17. The system of claim 16, wherein the processor is further configured to perform the steps of:
obtaining another search request from the requestor for another requested IoT device or another requested data feed;
determining that the another requested IoT device or the another requested data feed does not have an associated node located in the graph database; and
returning a generic answer to the another search request.

18. The system of claim 14, wherein the processor is further configured to perform the step of adding a new ontology to the hierarchical ontology, wherein the new ontology modifies at least one characteristic of the hierarchical ontology.

* * * * *